Patented Apr. 27, 1926.

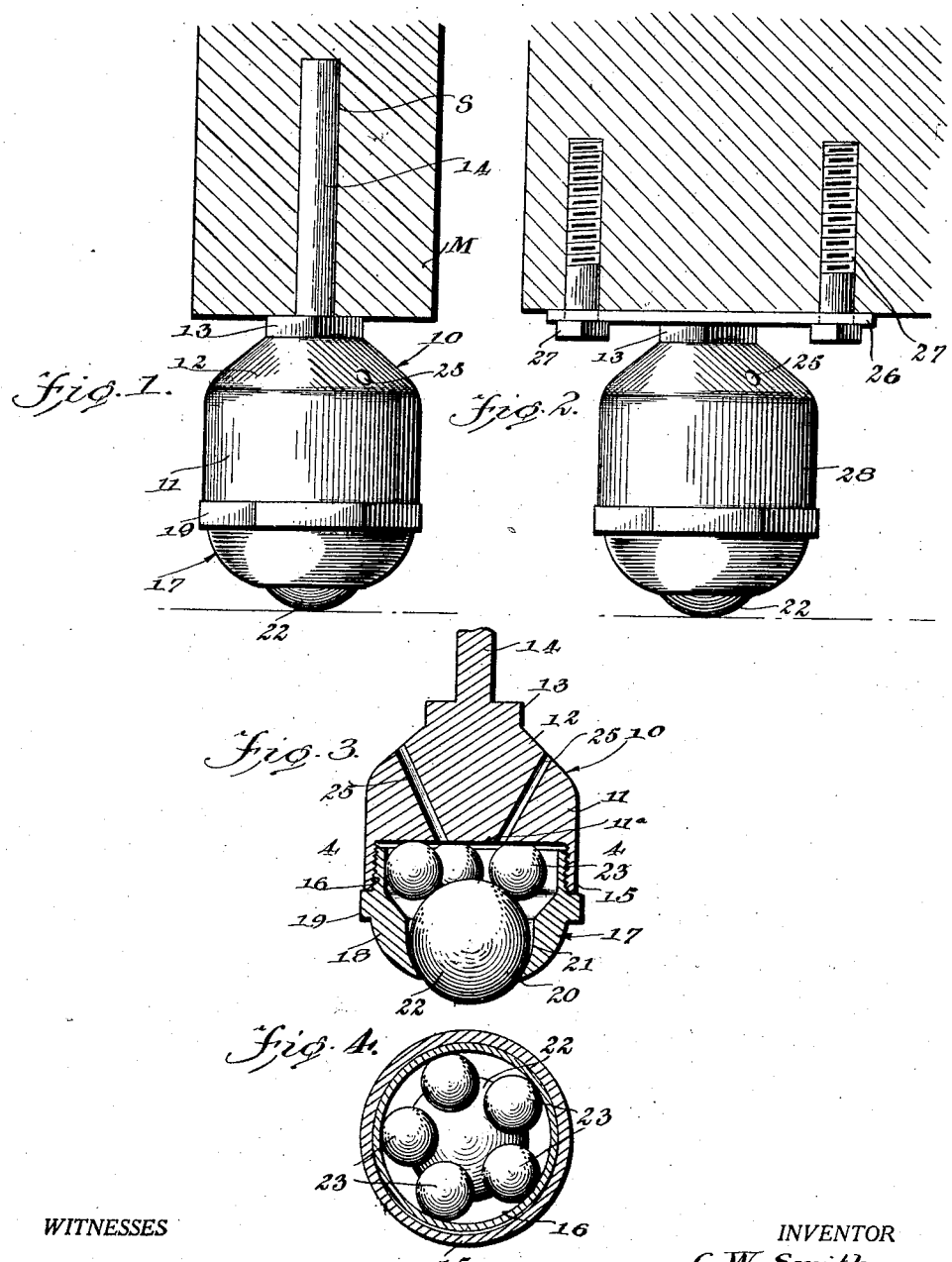

1,582,795

UNITED STATES PATENT OFFICE.

CLARENCE WILLARD SMITH, OF MEXIA, TEXAS.

CASTER.

Application filed May 10, 1923. Serial No. 638,081.

*To all whom it may concern:*

Be it known that I, CLARENCE WILLARD SMITH, a citizen of the United States, and a resident of Mexia, in the county of Limestone and State of Texas, have invented certain new and useful Improvements in Casters, of which the following is a specification.

This invention relates to an improvement in casters, and the object of the invention is to provide a caster which is strong and durable yet of simple construction and which is attractive in appearance, the caster being so constructed and organized to be susceptible of being readily taken away for purposes of replacement and repair and being adapted to be quickly and permanently lubricated without necessitating detaching the same from the article or device to which it is applied.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a view in elevation, showing one form of attaching caster;

Figure 2 is a similar view, showing a slightly modified form;

Figure 3 is a fragmentary view of the caster, taken partly in vertical section and partly in elevation; and Figure 4 is a view in horizontal section, one line 4—4 of Figure 3.

Referring to the drawings and more especially to Figures 1, 2, 3 and 4, the numeral 10 designates the stock or body portion of the caster which includes a cylindrical portion 11 converging or tapering toward the upper part of the caster as indicated at 12. Above the tapered portion 12 of the caster a shoulder 13 of polygonal formation is provided and above the shoulder 13 an attaching stem 14 is integrally formed and provides one means of attaching the shoulder to the article or device to which the caster is applied, the stem 14 fitting in the socket S provided therefor in the member M to which the caster is applied. A depending annular flange 15 is integrally formed with the portion 11 of the stock or body of the caster and is continuous with the outer periphery of the cylindrical portion. This depending flange 15 is internally threaded and is threadedly engaged with an externally threaded flange 16 provided on a retaining cup 17. The retaining cup 17 includes a concavo convex portion 18 and is provided with a shoulder 19 of polygonal formation which is disposed intermediate the concavo convex portion 18 and the flange 16 thereof. The concavo convex portion of the retaining cup is provided with an opening 20 and around and above said opening it is formed with a smooth bearing surface 21. On the bearing surface 21 a floor engaging portion or ball 22 is arranged and this ball 22 has a section thereof projecting through the opening 20 and below the retaining cup 18. The ball 22 is maintained on the bearing surface 21 and projecting through the opening 20 by a number, preferably five, of anti-friction balls 23 which are arranged above and engaging the ball 22, the anti-friction balls 22 also engaging the inner smooth surface of the flange 16 of the retaining cup and a smooth flat surface 11ª of the stock or body portion 10 which is comprehended within the flange 15. In this manner while the ball 22 is firmly maintained in position to engage the floor or supporting surface at all times it is nevertheless free to partake of movement in any direction. Preferably the arrangement is such that the ball 22 is forced slightly away from its seat or supporting surface 21 when active to support the caster the ball 22 at such time engaging the anti-friction balls 23.

The polygonal shoulders 13 and 19 greatly facilitate assembly and disassembly of the retaining cup or stock or body portion and render it easily accessible to the interior of the caster as well as the balls 22 and 23, thus greatly facilitating replacement and repair of the various parts.

In order to provide lubrication for the caster the stock or body portion 11 is drilled or otherwise suitably formed with a number, preferably two, of oil ducts 25 which extend from the tapered portion 12 through the body of the stock into the space or cavity in which the balls 22 and 23 are arranged, this space or cavity being defined by the stock or body portion 11, its flange 15, and the parts of the retaining cup 17.

In lieu of providing an integral stem 14 and fitting the same in a suitable socket or element to be supported a supporting plate 26 may be provided, the supporting plate 26 being suitably secured to the caster and being attached by screws 27 to the member to be supported. The caster of Figure 2 which is designated at 28 is in all other respects identical in construction and mode of operation as that shown in Figures 1, 3 and 4.

I claim:

In a caster, a stock having a cylindrical body and being tapered toward its upper end and provided at its upper end with a polygonal shoulder having attaching means above said shoulder, said stock being also provided with a depending and internally threaded annular flange, a retaining cup having an upstanding externally threaded annular flange engageable with the stock and being provided with a concavo convex body portion having an opening therein and provided with a bearing surface around said opening, said cup also having a shoulder of polygonal formation intermediate its flange and its concavo-convex body portion, a floor engaging ball arranged in the retaining cup and having a portion thereof projecting through the opening in the cup and below the caster, and anti-friction balls engaging the supporting ball, the flange of the retaining cup and the adjacent face of the stock.

CLARENCE WILLARD SMITH.